United States Patent [19]

Oberdörster et al.

[11] Patent Number: 5,259,488
[45] Date of Patent: Nov. 9, 1993

[54] FLUID FRICTION COUPLING

[75] Inventors: Franz-Josef Oberdörster, Neunkirchen-Seelscheid; Paul-Erich Schönenbrücher, Much-Kranüchel, both of Fed. Rep. of Germany

[73] Assignee: Viscodrive GmbH, Lohmar, Fed. Rep. of Germany

[21] Appl. No.: 863,428

[22] Filed: Apr. 3, 1992

[30] Foreign Application Priority Data

Apr. 8, 1991 [DE] Fed. Rep. of Germany ....... 4111269

[51] Int. Cl.⁵ ............................................. F16D 35/00
[52] U.S. Cl. .................................. 192/58 A; 192/58 B
[58] Field of Search ................ 192/58 A, 58 B, 58 C, 192/57; 475/87, 85

[56] References Cited

U.S. PATENT DOCUMENTS

| | | | |
|---|---|---|---|
| 4,989,687 | 2/1991 | Kwoka et al. | 180/248 |
| 5,007,515 | 4/1991 | Shimizu | 192/58 B X |
| 5,041,065 | 8/1991 | Kwoka | 475/87 |
| 5,060,775 | 10/1991 | Kwoka | 192/58 B |
| 5,162,023 | 11/1992 | Kwoka | 475/87 |

FOREIGN PATENT DOCUMENTS

| | | | |
|---|---|---|---|
| 3627504 | 2/1988 | Fed. Rep. of Germany .... | 192/58 B |
| 3828422 | 4/1989 | Fed. Rep. of Germany . | |
| 0076932 | 3/1990 | Japan | 192/58 B |

*Primary Examiner*—Rodney H. Bonck
*Attorney, Agent, or Firm*—Harness, Dickey & Pierce

[57] ABSTRACT

The invention relates to a fluid friction coupling having at least two sets of plates. A first coupling part is designed as a coupling hub and a second coupling part is designed as a coupling housing In the interior cavity of the coupling housing, the inner plates and outer plates are alternately interleaved with one another. The inner plates have chamfered portions which are arranged such that two adjoining inner plates are positioned in a mirror-image-like way. Thus, it is possible to prevent a pumping action which affects the viscous fluid in the interior of the fluid friction coupling.

8 Claims, 2 Drawing Sheets

FLUID FRICTION COUPLING

BACKGROUND OF THE INVENTION

The invention relates to a fluid friction coupling. The coupling includes a hub, a housing and at least two sets of plates. An interior cavity is formed between the coupling housing and the hub and the portion not occupied by the plates is at least partially filled by a viscous fluid The plates of one set and the plates of the other set are alternately interleaved with one another. The plates are non-rotatingly associated with the hub and housing. The plates of one set of plates include radially extending slots which open towards the plate edge. Plate segments are formed between the slots and include scraping, radially extending chamfered portions which may contact the surface of one of the opposed planar plates The chamfered portions project axially from one side of the plates planar surface.

Prior art fluid friction couplings have their coupling plates alternately arranged such that one coupling plate is associated with the one coupling part and the alternating plate coupled with the other coupling part. Ordinarily, the outer plates associated with the housing are preferably arranged at a desired distance from one another. Relative to the housing outer plates, the inner plates are axially movably supported in hub teeth which non-rotatingly accommodate them. The interior cavity of the coupling, which houses the plates, is at least partially filled with silicon oil. These couplings are preferably used in drivelines of motor vehicles For example, the couplings are used in four wheel drive vehicles, between the rear and front axle, in connection with a differential to ensure that if a low adhesion coefficient occurs at the front or rear wheels, there is a differential effect by connecting the drive with the wheels of the other axle.

If a speed differential occurs between the coupling housing and hub, e.g. between the outer plates and inner plates, the shear load affecting the viscous medium, e.g. silicon oil, causes a moment build so that a torque is transmitted to the normally non-driven wheels. The shear load acting on the viscous fluid results in a temperature increase and thus in an expansion of the volume of fluid in the interior cavity of the fluid friction coupling. As soon as the interior cavity is completely filled, the unfixed inner plates begin to move axially in the direction of one of the adjoining fixed outer plates. This movement, caused by the normally movable plates not remaining centrally positioned between two fixed plates, forms different gap sizes between the adjoining plates. Because of different throttle effects on the two sides of the plate, the pressure increases more quickly in the larger gap so that the movable plates move in the direction of the fixed plate adjoining the smaller gap. When the movable plate comes into contact with one side of the fixed plate, a friction locking effect occurs so that the coupling operates at least in a dual mode. On the one hand, the viscous fluid is subjected to a shear load and on the other hand, there exists a friction contact. Thus, the coupling acts as a friction coupling because the plates are in contact with each other. This effect is referred to as "hump" effect. Hump effect constitutes a kind of self-protecting function for the coupling since it prevents overloading. The hump mode of a fluid friction coupling is achieved for example if there exist different friction conditions between the individual vehicle wheels and the ground so that there may occur a differential speed between the wheels of one axle or between the wheels of two axles.

The transition of the fluid friction coupling into the hum mode may be initiated prematurely by suitable supportive measures. DE-PS 38 28 421 C 1, DE-PS 38 28 422 C 1 and DE 39 34 327 C 1 each propose a fluid friction coupling with a set of slotted plates. The radially extending slots form segments, between adjacent slots, whose radially extending edges are bent. This design improves the transition from a normal operating mode into the hump mode as a result of the axial force component caused by the hydrodynamic effect of such bent portions.

The disadvantage of above fluid friction coupling plates is that a reaction force occurs which acts o the plates against the axial force component, which acts on the viscous fluid, and results in a pumping effect which presses the fluid contained in the coupling interior against one axial end of the housing. In extreme cases, this could lead to the plates arranged at the opposite end of the coupling interior cavity to run dry, causing increased plate wear.

SUMMARY OF THE INVENTION

It is an object of the present invention to provide a fluid friction coupling where the pumping effect on the viscous fluid inside the fluid friction coupling is prevented while maintaining the axial effect of the chamfers.

In accordance with the invention, the objective is achieved by aligning the chamfered portions of two adjoining plates of a set of plates as mirror-images.

The mirror-image alignment of the chamfers of two adjoining plates prevents an intensifying pumping effect on the fluid and generates counter flows which offset each other, at least partially, so as to ensure an approximately uniform distribution of the fluid in the interior cavity of the fluid friction coupling. Thus, it is possible to avoid the above-mentioned disadvantages such as dry-running of some plates. The chamfers of two adjoining plates of a set of plates may be directed towards each other or away from each other.

In a further embodiment of the invention, the chamfers of a set of plates may be arranged in mirror-image pairs.

Alternatively, it is possible for the chamfered portions of a set of plates to be composed in groups facing the same direction and arranged mirror-image-like relative to the adjoining groups, the groups include two or more individual plates.

To achieve relatively fine and thin chamfers, it is proposed that the limiting edges should have bent portions.

In a further embodiment of the invention, the plates having chamfers are associated with the coupling hub or the coupling housing.

From the following detailed description taken in conjunction objects and advantages of the present invention will become apparent to those skilled in the art.

BRIEF DESCRIPTION OF THE DRAWINGS explained in greater detail.

DETAILED DESCRIPTION OF THE PREFERRED EMBODIMENTS

Figure 1:
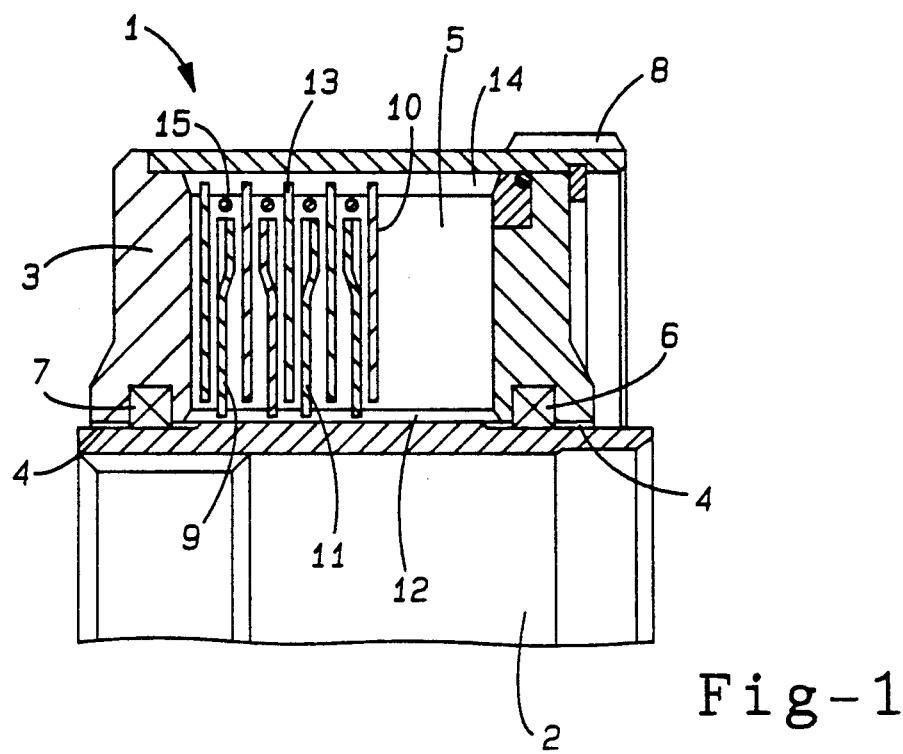
FIG. 1 is a side view, partially in section, of a fluid friction coupling with inner plates arranged in accordance with the invention.
Figure 2:
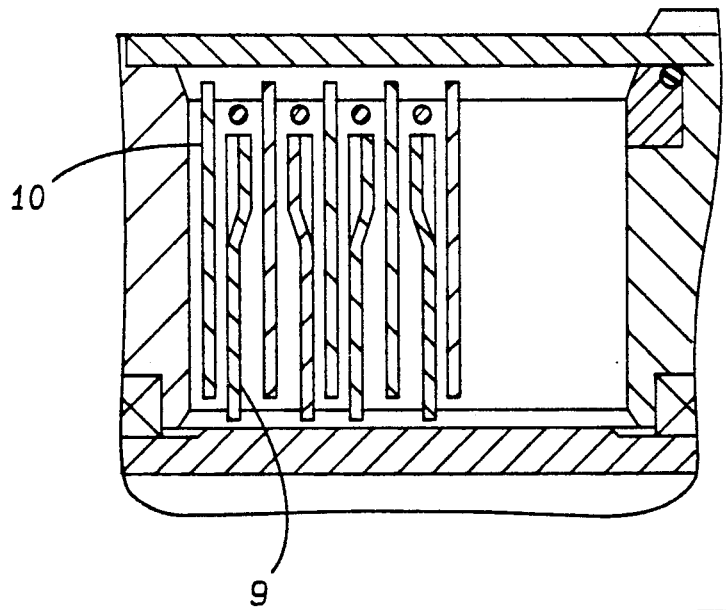
FIG. 2 is a view like FIG. 1 with a further arrangement of inner plates.

FIGS. 1 and 2 show a fluid friction coupling 1 with a coupling hub 2 and a coupling housing 3. The coupling hub 2 is supported relative to the coupling housing 3 via two friction bearings 4 and connected to the driveshaft via a multi-spline profile. The interior cavity 5 of the fluid friction coupling 1 is sealed by two seals 6 and 7. The coupling housing 3 includes outer teeth 8 which effect drive. In these two Figures, the coupling hub 2 is associated with inner plates 9. The inner plates 9 are axially movable, to a limited extent, and are alternately arranged with the outer plates 10 in the interior cavity 5 of the coupling housing 3. The interior cavity 5 is at least partially filled with a viscous fluid.

Via inner teeth 11, the inner plates 9 are non-rotatingly connected to the corresponding teeth 12 of the coupling hub 2. The outer plates 10 via outer teeth 13, are non-rotatingly connected to the corresponding teeth 14 of the coupling housing 3. The outer plates 10 are spaced by spacing rings 15. The inner plates 9 and outer plates 10 are substantially planar and provided with slots and holes. At the edges of the slots, the inner plates 9 include chamfered portions 16. When the coupling operates in the hump mode, the chamfered portions rest against the adjoining outer plates 10 of the coupling housing 3. As compared to conventional fluid frictions couplings, this design improves the hump behavior as a result of the self-cleaning effect and the axial force component acting on the plates. To avoid a simultaneous pumping effect acting on the viscous fluid in the interior cavity 5 of the fluid friction coupling, the inner plates 9, with their chamfered portions 16, are arranged in a mirror-image-like way. Because of the mirror-image arrangement of the chamfered portions 16 of two adjoining inner plates, an intensifying pumping effect acting on the viscous fluid is avoided. Counter flows are generated in the cavity 5 which at least partially offset each other. The offsetting ensures an approximately uniform distribution of the fluid in the interior cavity 5 of the fluid friction coupling.

In FIG. 1, the inner plates 9 of the fluid friction coupling 1 are arranged in mirror-image pairs relative to each other.

FIG. 2 shows an alternative for arranging the inner plates 9. The inner plates 9 are arranged in groups of two plates facing the same direction while the adjoining group of two plates faces the opposite direction. It is conceivable to form larger groups of more than two inner plates 9. The outer plates 10 in Figures 1 and 2 are shown without any chamfers, however, the inner and outer plates could be switched to have the chamfers on the outside plates.

Figure 3:
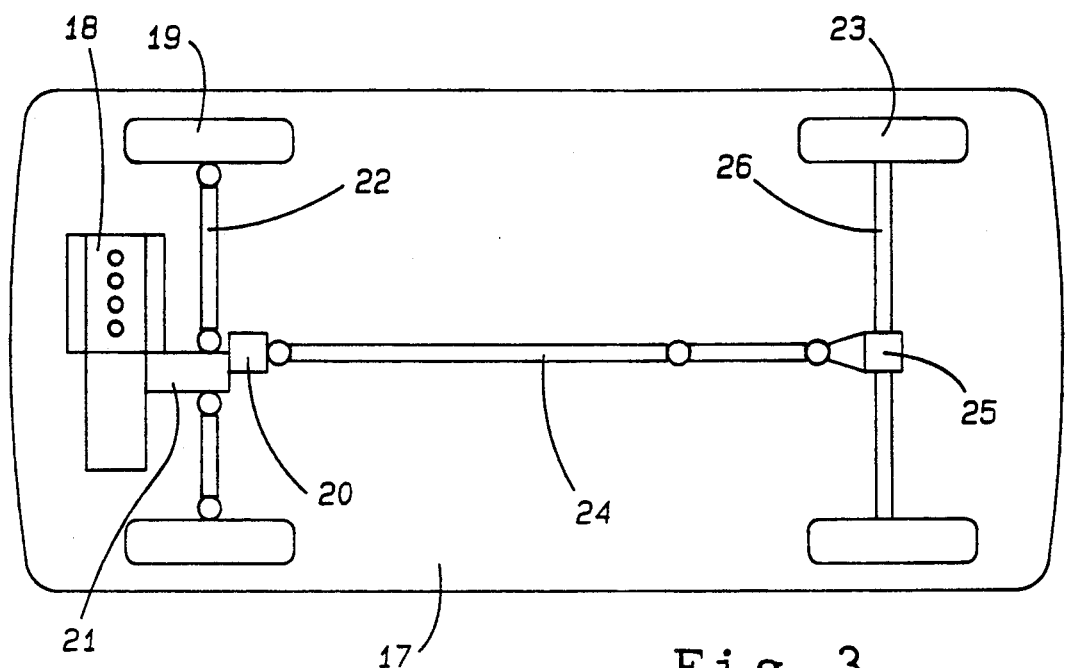
FIG. 3 is a schematic view of a drive concept for a four wheel drive motor vehicle.

FIG. 3 illustrates the drive train of a four wheel-drive motor vehicle 17 provided with a transversely arranged engine/gearbox unit 18. The front wheels 19 are driven via a front axle differential 21 and front sideshafts 22. The drive for the rear wheels 23 is branched off from the central differential 20 via the propeller shaft 24 the rear axle differential 25 and the rear sideshafts 26. One or all of the illustrated differentials 20, 21, 25 may be improved by the proposed fluid friction coupling 1 according to FIGS. 1 and 2. Also, an individual fluid friction coupling 1 may be incorporated into the longitudinal driveline of the motor vehicle 17.

Figure 4:
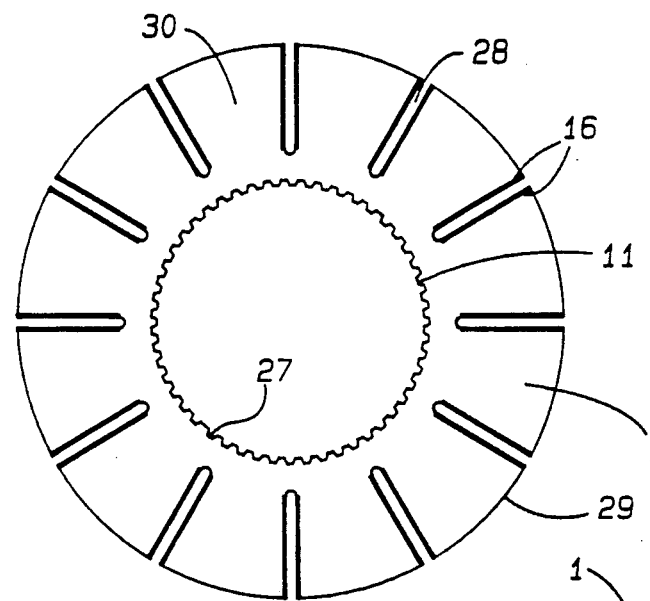
FIG. 4 is an elevational view of a single plate of the fluid friction coupling in accordance with the present invention.

FIG. 4 shows an inner plate 9 with a central bore 27 and inner teeth which non-rotatingly, but axially movably accommodate the inner plate on teeth 12 of the coupling hub 2. Circumferentially distributed radially extending slots 28, which are open towards the circumferential edge 29, are provided in the plate. The segments 30, between adjacent slots, include chamfered portions 16 which, in each case, face one axial end of the plate. Figures and 2 illustrate how the plates are associated with other parts.

Figure 5:
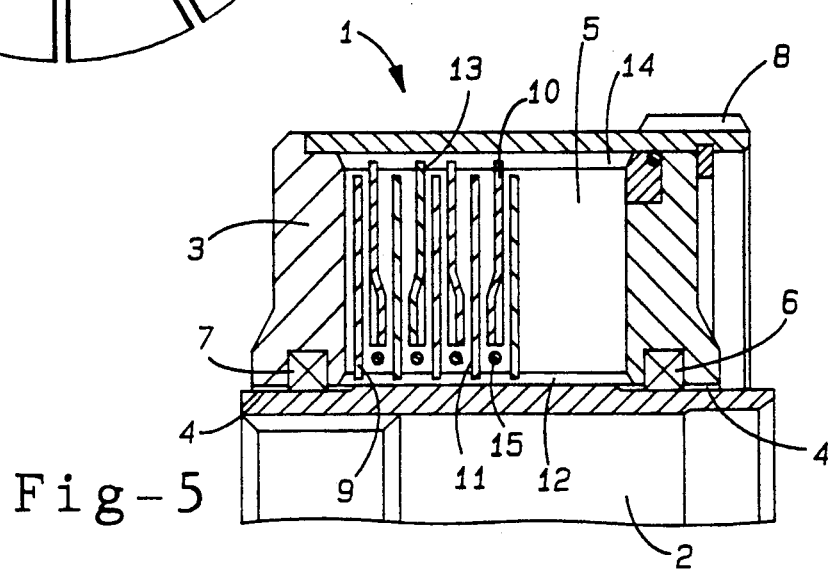
FIG. 5 is a view like FIG. 1 with the chamfered portions on the other plates.

FIG. 5 illustrates an embodiment like that of FIG. 1. In FIG. 5, the chamfered portions 16 are on the outer plates 10 and the spacers 15 are adjacent the hub 2.

While the above detailed description describes the preferred embodiment of the present invention, the invention is susceptible to modification, variation, and alteration without deviating from the scope and fair meaning of the subjoined claims.

We claim:

1. A fluid friction coupling comprising:
a hub;
a housing coupled with said hub to form an interior cavity at least partially filled by a viscous fluid; and
at least a first and second set of plates in said interior cavity, said first set of plates and said second set of plates alternately interleaved with one another such that a single plate of said first or second set of plates is between a single plate of said second or first set of plates and said first and second set of plates being non-rotatingly associated with the hub and housing, respectively, each plate of one set of plates including radially extending slots which open towards the plate edge, planar plate segments are formed between adjacent slots the radially extending edges of each slot having radially extending chamfered portions which may contact the surface of one of the opposed plates, said chamfered portions project axially from one side only of the planar plate segment surface of the plate, and said chamfered portions of adjacent plates of one of said set of plates being aligned in a mirror-image-like way.

2. A fluid friction coupling according to claim 1, wherein said chamfered portions face one another.

3. A fluid friction coupling according to claim 1, wherein said chamfered portions face away from one another.

4. A fluid friction coupling according claim 1, wherein said chamfered portions of a set of plates are arranged in mirror-image pairs.

5. A fluid friction coupling according to claim 1, wherein said chamfered portions are bent portions.

6. A fluid friction coupling according to claim 1, wherein said first set of plates is associated with the coupling hub.

7. A fluid friction coupling according to claim 1, wherein said first set of plates is associated with the coupling housing.

8. A fluid friction coupling comprising:
a hub;
a housing coupled with said hub to form an interior cavity at least partially filled by a viscous fluid; and at least a first and second set of plates in said interior cavity, said first set of plates and said second set of plates alternately interleaved with one another such that a single plate of said first or second set of plates is between a single plate of said second or first set of plates and said first and second set of plates being non-rotatingly associated with the hub and housing, respectively, each plate of one set of plates including radially extending slots which open towards the plate edge, planar plate segments are formed between adjacent slots the radially extending edges of each slot having radially extending chamfered portions, said chamfered portions of a set of plates are composed in groups facing the same direction and arranged mirror-image-like relative to the adjoining groups.

* * * * *